(12) United States Patent
de Grood et al.

(10) Patent No.: US 7,730,948 B2
(45) Date of Patent: Jun. 8, 2010

(54) USE OF COATED PROPPANT TO MINIMIZE ABRASIVE EROSION IN HIGH RATE FRACTURING OPERATIONS

(75) Inventors: Rudolphus Johannes Cornelis de Grood, Kingwood, TX (US); Perry D. Baycroft, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 273 days.

(21) Appl. No.: 11/369,413

(22) Filed: Mar. 7, 2006

(65) Prior Publication Data

US 2006/0243441 A1 Nov. 2, 2006

Related U.S. Application Data

(60) Provisional application No. 60/659,160, filed on Mar. 7, 2005.

(51) Int. Cl.
*E21B 43/267* (2006.01)
*C09K 8/80* (2006.01)

(52) U.S. Cl. .............. 166/280.2; 166/308.3; 428/404; 428/407; 507/219; 507/269; 507/924

(58) Field of Classification Search .................. None
See application file for complete search history.

(56) References Cited

U.S. PATENT DOCUMENTS

| 4,494,318 | A | 1/1985 | Smillie | 34/112 |
|---|---|---|---|---|
| 4,694,905 | A | 9/1987 | Armbruster | 166/280 |
| 5,604,184 | A | 2/1997 | Ellis et al. | 507/117 |
| 6,528,157 | B1 * | 3/2003 | Hussain et al. | 428/325 |
| 6,632,527 | B1 | 10/2003 | McDaniel et al. | 428/402 |
| 2005/0244641 | A1 * | 11/2005 | Vincent | 428/403 |
| 2007/0054121 | A1 * | 3/2007 | Weintritt et al. | 428/403 |

OTHER PUBLICATIONS www2.dupont.com, "Fluoropolymer Comparison—Typical Properties," undated (updated regularly).*
http://en.wikipedia.org, "Polytetrafluoroethylene," undated (updated regularly).*
www.wikipedia.org, "Thermoplastics," undated (updated regularly).*

* cited by examiner

*Primary Examiner*—Zakiya W. Bates
(74) *Attorney, Agent, or Firm*—Shawn Hunter

(57) ABSTRACT

Methods for reducing wear in pumping components during fracturing operations. A coated proppant is used that causes less wear on the pumping components as the proppant is pumped into the wellbore. The proppant coating consists of a substrate having a coating thereupon which eliminates sharp edges on the substrate and functions as a lubricant to materially reduce mechanical erosion of the pumping components. The proppant substrate may consist of any of a number of materials, including sand, ceramic, resin coated sand, or resin coated ceramic particle. The coating preferably comprises one or more layers of one or more of the following materials (or the coating having low friction coefficients is part of a mixture of the coating): antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, or tungsten disulfideor zinc oxide. The coating material may be applied to the substrate in a number of ways known in the art.

17 Claims, No Drawings

USE OF COATED PROPPANT TO MINIMIZE ABRASIVE EROSION IN HIGH RATE FRACTURING OPERATIONS

Priority is claimed to U.S. Provisional Patent Application Ser. No. 60/659,160 filed Mar. 7, 2005.

BACKGROUND OF THE INVENTION

1. Field of the Invention

The invention relates generally to devices and methods for decreasing erosion damage to pumping components during downhole fracturing operations and for extending the life of the equipment used. In particular aspects, the invention relates to the composition of proppants used in fracturing operations.

2. Description of the Related Art

Fracturing operations are used to improve the flow of hydrocarbons from a subterranean formation and into a wellbore. Fracturing involves pumping of a fracturing fluid into the wellbore under extremely high pressure in order to induce fracturing in the formation rock immediately surrounding the wellbore. Fracturing increases the porosity in the formation and allows freer transmission of hydrocarbons through the formation and into the wellbore. Proppants are often included in the fracturing fluid. Proppants are generally particulate matter that is carried in a fracturing fluid. The proppant particles will reside within the small cracks and crevices of the formation that are created by the fracturing fluid, effectively permitting freer flow of fluids to continue after the fracturing agent is no longer pumped down the wellbore under pressure.

Currently, attempts are being made to increase the lengths of the zones that can be fractured and packed with proppant (i.e., increased zone lengths of about 300-400 feet are being considered). This increase in length dictates raising the treatment pump rate and proppant volume to be able to treat these lengthened zones. Unfortunately, increasing pump rate and proppant volume has significant deleterious effects upon the pumping components, including fluid conveying tubing, surface lines, chokes, manifolds, work strings, valves, and the downhole gravel pack liner assembly. Conventional proppants are extremely erosive and create tremendous wear upon pumping equipment during use. Erosion is usually a function of flow velocity and the amount of abrasive material being flowed. The erosion rate increases in direct correspondence with an increase in proppant volume (i.e., doubling the amount of proppant doubles the erosion rate). However, doubling the pump rate will increase the amount of erosion by a factor of four. As a result, operations that require both increased proppant amounts and increased flow rates are particularly problematic.

The components that tend to suffer the most severe damage during pumping of proppants are portions of the cross-over tool, including the cross-over port, cross-over housing, and lower extension. The casing and other elements on the gravel pack liner assembly where changes in interior casing diameter will also demonstrate significant wear.

To date, the conventional wisdom has been that measures taken to reduce erosion damage caused by the proppant might also tend to reduce the effectiveness of the proppant in the formation. For this reason, the inventors believe that they have not been used in conventional hydraulic fracturing operations or fracture packing operations wherein they are run through a cross-over tool. Instead, resin-coated proppants have been used primarily in hydraulic fracture stimulation treatments.

Resin-coated proppants are known materials. A coating method is described, for example, in U.S. Pat. No. 4,494,318 issued to Smillie. Further, such resin-coated proppants are available commercially from suppliers such as Santrol and Borden Chemical. However, conventional resin-coated proppants are not coated with the goal of reducing erosion and, as a result, do not perform this function optimally. Most conventional coatings are designed to provide improved strength to the proppant substrate, thereby, increasing the strength of the proppant particle within the formation fracture. Alternatively, coatings are engineered to permit the individual proppant particles to bond together to help control proppant flowback, which might occur as production fluid is flowed into the wellbore at an increased rate. An example of this type of proppant is described in U.S. Pat. No. 5,604,184 issued to Ellis et al.

The present invention addresses the problems of the prior art.

SUMMARY OF THE INVENTION

The invention provides improved methods for reducing wear in pumping components and down hole tools, completion tubing and casing and related hardware during fracturing operations. A coated proppant is used that causes less wear on the pumping components as the proppant is pumped into the wellbore. In preferred embodiments, the proppant coating consists of a substrate having a coating thereupon which eliminates sharp edges on the substrate and functions as a lubricant to materially reduce mechanical erosion of the pumping components. Ideally, the coated proppant will have a low friction factor and high impact resistance that renders it resistant to chipping and shattering. The proppant substrate may consist of any of a number of materials, including sand, ceramic, resin coated sand, or resin coated ceramic particle. The coating preferably comprises one or more layers of one or more of the following materials having low friction coefficients: antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, or tungsten disulfideor zinc oxide. The coating material may be applied to the substrate in a number of ways known in the art.

DETAILED DESCRIPTION OF THE PREFERRED EMBODIMENTS

As noted, the invention provides a coated proppant having lubricating and/or abrasion-reducing properties, thereby reducing the amount of mechanical erosion experienced by pumping components and completion tubulars and casing and related down hole hardware (equipment) during fracturing operations. In a related aspect, the invention provides methods for reducing erosion upon such equipment.

In accordance with the present invention, a proppant is provided that includes a substrate and an abrasion-resistant coating thereupon. The proppant substrate may consist of any of a number of materials, including sand, ceramic, resin coated sand, or resin coated ceramic particles.

The coating for the proppant provides a bonded, solid film lubricant for the proppant particle. The coating materials have inherent lubricating properties that reduce friction between the proppant particle and pumping equipment. The coating should ideally provide a friction coefficient that is less than 0.04. The coating preferably comprises one or more layers of one or more of the following abrasion-resistant materials: antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, or tungsten disulfideor zinc oxide.

The coating (which can be a friction reducing component and/or and is part the total coating composition applied) is bonded to the substrate using any of a number of known techniques, including resin bonding, burnishing, mechanical impingement or vacuum deposition. In addition, the coating materials may be air or thermoset applied, or applied and cured using other techniques known in the art. The coating can be designed to be pre-cured or curable under down hole temperature and pressure. The coating will typically make up approximately 2-6% by weight of the total weight of the proppant particle, and preferably from 2-4%.

The coated proppant is suspended within a fracturing fluid, or carrier fluid, to form a slurry for use in fracturing the wellbore and packing portions of the wellbore with proppant. The fracturing fluid may comprise sea water, fresh water, hydrocarbons, foams, or other carrier agents known in the art. Because the proppant used is less abrasive than conventional proppants, there may be a greater concentration volume of proppant placed into suspension within the fracturing fluid and increase the total volume of proppant to be pumped and placed in the formation.

The use of proppants coated in accordance with the present invention allows high flow rate and high proppant volume pumping operations to be performed. The pumping and down hole components are not subjected to an unacceptable level of abrasion and erosion damage. A fracturing agent containing coated proppant in accordance with the present invention is pumped into the wellbore in order to fracture the formation rock surrounding the borehole. The fracturing fluid, carrying the proppant in slurry, is passed through the pumping machinery, well completion tubulars, cross-over tool, casing and associated valves. The lubrication and abrasion resistance provided by the coating of the proppant precludes significant erosion damage to these components. As a result, higher rate of flow are possible as well as higher concentrations of proppants within the fracturing agent.

The following table indicates the difference in pumping capacity utilizing coated proppants in accordance with the present invention as compared to standard prior art uncoated proppants:

| CONDITION | UNCOATED PROPPANTS | COATED PROPPANTS |
| --- | --- | --- |
| Pumping rate | 15-25 bpm | 25-40 bpm |
| Proppant concentration | 10-12 ppa* | 12-15 ppa* |
| Proppant volume | 250,000 lbs | 400,000 to 800,000 lbs. |
| Flow Velocity | 70-400 ft/sec. | 70-800 ft./sec. |

*Pounds proppant added (per gallon)

Those of skill in the art will recognize that numerous modifications and changes may be made to the exemplary designs and embodiments described herein and that the invention is limited only by the claims that follow and any equivalents thereof.

What is claimed is:

1. A proppant for use in fracturing operations comprising:
a substrate;
an abrasion-resistant coating disposed upon the substrate, the abrasion-resistant coating comprises one or more of abrasion-resistant materials from the group consisting essentially of: antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, and tungsten disulfideor zinc oxide; and
the substrate and coating providing a coated proppant having a coefficient of friction that is less than 0.04.

2. The proppant of claim 1 wherein the substrate comprises one or more of the materials from the group consisting essentially of sand, ceramic, resin coated sand, or resin coated ceramic particles.

3. A proppant for use in fracturing operation comprising:
a substrate;
a coating for said substrate comprising an abrasion-resistant material; and
the substrate and coating providing a coated proppant that provides a friction coefficient that is less than 0.04.

4. The proppant of claim 3 wherein the coating comprises one or more abrasion-resistant materials from the group consisting of: antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, and tungsten disulfideor zinc oxide.

5. The proppant of claim 3 wherein the coating comprises one or more abrasion-resistant materials from the group consisting essentially of: antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, and tungsten disulfideor zinc oxide.

6. The proppant of claim 3 wherein the substrate comprises one or more materials from the group consisting essentially of sand, ceramic, resin coated sand, or resin coated ceramic particles.

7. A fracturing slurry comprising:
a fracturing fluid;
a proppant carried within the fracturing fluid, the proppant comprising:
a substrate;
a coating for said substrate comprising an abrasion-resistant material; and the substrate and coating providing a coated proppant that provides a friction coefficient that is less than 0.04.

8. The fracturing slurry of claim 7 wherein the coating comprises one or more abrasion-resistant materials from the group consisting of: antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, and tungsten disulfideor zinc oxide.

9. The fracturing slurry of claim 7 wherein the coating comprises one or more abrasion-resistant materials from the group consisting essentially of: antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, and tungsten disulfideor zinc oxide.

10. The fracturing slurry of claim 7 wherein there is a concentration of proppant from 12 to 15 ppa.

11. A method of providing fracturing and proppant treatment for a zone within a wellbore while providing reduced erosion upon pumping equipment, the method comprising:
pumping a fracturing slurry into a wellbore, the slurry comprising a mixture of a fracturing fluid and a proppant carried within the fracturing fluid, the proppant comprising a substrate and a coating thereupon comprising an abrasion-resistant material to provide a coated proppant having a friction coefficient that is less than 0.04;

fracturing a zone of formation rock immediately surrounding the wellbore by pressurizing said fracturing fluid; and disposing coated proppant within said zone of said wellbore.

12. The method of claim 11 wherein the slurry has a concentration of proppant that is from 12 to 15 ppa.

13. The method of claim 11 wherein the slurry is pumped into said wellbore at a rate from 25 to 40 bpm.

14. The method of claim 11 wherein the slurry is flowed at a rate of 70 to 800 feet per second.

15. The method of claim 11 wherein the zone of formation is from 300-400 feet in length.

16. The method of claim 11 wherein the coating comprises one or more abrasion-resistant materials from the group consisting of: antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, and tungsten disulfideor zinc oxide.

17. The method of claim 11 wherein the coating comprises one or more abrasion-resistant materials from the group consisting essentially of: antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, and tungsten disulfideor zinc oxide.

* * * * *